(12) United States Patent
Elflein et al.

(10) Patent No.: US 7,604,262 B2
(45) Date of Patent: Oct. 20, 2009

(54) SEALING ARRANGEMENT FOR A HYDRAULIC PLUG-IN CONNECTION

(75) Inventors: Stephen Elflein, Rentweinsdorf (DE); Albert Vogel, Hassfurt (DE)

(73) Assignee: FTE automotive GmbH, Ebern (DE)

( * ) Notice: Subject to any disclaimer, the term of this patent is extended or adjusted under 35 U.S.C. 154(b) by 351 days.

(21) Appl. No.: 11/728,769

(22) Filed: Mar. 27, 2007

(65) Prior Publication Data
US 2007/0228731 A1 Oct. 4, 2007

(30) Foreign Application Priority Data
Mar. 31, 2006 (DE) .................. 10 2006 015 555

(51) Int. Cl.
*F16L 17/00* (2006.01)
(52) U.S. Cl. .................. 285/347; 285/374; 285/379; 285/325; 285/305
(58) Field of Classification Search .................. 285/18, 285/31, 80, 196, 305, 319, 321, 322, 325, 285/330, 347, 351, 374, 379; 277/607, 615, 277/616, 619, 624, 626; 192/85 R, 85 V; 188/322.16, 322.17, 322.18; 403/353
See application file for complete search history.

(56) References Cited

U.S. PATENT DOCUMENTS

| | | | | |
|---|---|---|---|---|
| 823,346 A | * | 6/1906 | Maxwell | 285/325 |
| 1,806,788 A | * | 5/1931 | Cross et al. | 285/327 |
| 1,838,574 A | * | 12/1931 | Ross | 285/325 |
| 1,982,183 A | * | 11/1934 | Tarbox | 403/331 |
| 2,265,268 A | * | 12/1941 | Culligan | 285/325 |
| 2,981,557 A | * | 4/1961 | Donnell et al. | 285/32 |
| 3,314,696 A | * | 4/1967 | Ferguson et al. | 285/148.14 |
| 3,433,488 A | * | 3/1969 | Grantom | 277/323 |
| 4,600,221 A | * | 7/1986 | Bimba | 285/91 |
| 5,374,088 A | * | 12/1994 | Moretti et al. | 285/305 |
| 5,423,580 A | * | 6/1995 | Mohlenkamp et al. | 285/379 |
| 5,542,716 A | * | 8/1996 | Szabo et al. | 285/305 |
| 5,607,250 A | * | 3/1997 | Tatterson et al. | 403/325 |
| 6,454,314 B1 | | 9/2002 | Grosspietsch et al. | |
| 2004/0136779 A1 | * | 7/2004 | Bhaskar | 403/353 |
| 2005/0087981 A1 | * | 4/2005 | Yamada et al. | 285/81 |

FOREIGN PATENT DOCUMENTS

DE  197 14 801 C1  1/1998

* cited by examiner

*Primary Examiner*—Daniel P Stodola
*Assistant Examiner*—Robert Williams
(74) *Attorney, Agent, or Firm*—Reising Ethington P.C.

(57) ABSTRACT

A sealing arrangement for a hydraulic plug-in connection for use in particular in the motor vehicle industry for hydraulic clutch and brake systems is fitted on a hydraulic plug-in connection and has a socket and a plug-in fitting which can be connected thereto. The plug-in fitting is attached to a hydraulic tube. The plug-in fitting has a sleeve and a sealing element fixed thereto, which seals off the plug-in connection both from the hydraulic tube and from the exterior of the socket. The sealing element and the end of the sleeve which receives the sealing element are designed so as to be able to install the sealing arrangement without it being possible for the sealing element to be separated axially from the sleeve when the plug-in connection is released.

5 Claims, 4 Drawing Sheets

SEALING ARRANGEMENT FOR A HYDRAULIC PLUG-IN CONNECTION

FIELD OF THE INVENTION

The invention relates to a sealing arrangement for a hydraulic plug-in connection, in particular for use in the motor vehicle industry for hydraulic clutch and brake systems.

DESCRIPTION OF PRIOR ART

In a known sealing arrangement (DE-A-197 14 801) for a hydraulic plug-in connection, a sealing element has on its inner peripheral surface a shaped profile which serves for form-fitting engagement with a shaped profile formed on the outer peripheral surface of a sleeve, in order to fix the sealing element to the sleeve. When the sealing element is installed by pushing it axially onto the associated end of the sleeve, the sealing element is partially widened elastically in order to bring the two shaped profiles into form-fitting engagement. This pre-assembly of the plug-in fitting is intended to captively fix the sealing element on the sleeve.

Once the plug-in fitting has been attached to a hydraulic line, the plug-in connection is established by inserting the plug-in fitting, together with the hydraulic line attached thereto, into a socket. With this assembly step, the sealing element is pressed against an associated inner peripheral surface of the socket, as a result of which the form-fitting engagement of the two shaped profiles is secured by being supported externally on the inner peripheral surface of the socket. The plug-in fitting can be pulled out of the socket by exerting a sufficient pulling force in the axial direction, in order to release the plug-in connection. Particularly in the event of incorrect handling, however, it is possible that the sleeve will become separated from the sealing element in the process.

In another known sealing arrangement (DE-A-198 48 213), the form-fitting connection of sleeve and sealing element is brought about by a radially inwardly pointing collar of the sleeve, which forms a radially inwardly directed annular groove, and a radially outwardly running protrusion on the sealing element which engages in the annular groove. This form-fitting connection is thus supported internally by the hydraulic line which is pushed into the plug-in fitting, so as to counteract the possibility of detachment of the sealing element from the sleeve when the plug-in fitting is pulled out of the socket. However, the pre-assembly of the sealing element on the sleeve is difficult, since here the radially outwardly pointing annular protrusion on the sealing element is forced through the opening of the collar, which is of much smaller diameter. Moreover, the radially outwardly pointing protrusion on the sealing element is connected to the main part of the sealing element only by way of a thin web-like attachment. When the plug-in fitting is pulled axially out of the socket, this web-like attachment may tear due to the sealing force which the main part of the sealing element exerts both on the socket and on the hydraulic line, as a result of which the damaged main part of the sealing element remains in the socket.

What is needed is to provide a sealing arrangement which facilitates the pre-assembly of the sealing element on the sleeve of the plug-in fitting and reliably prevents separation of the sealing element from the sleeve or damage to the sealing element when the plug-in connection is released.

SUMMARY OF THE INVENTION

According to the invention, in a sealing arrangement for a hydraulic plug-in connection which comprises a socket and a plug-in fitting which can be connected thereto, said plug-in fitting being attached to a hydraulic line and comprising a sleeve and an elastic sealing element which seals off the plug-in connection from the exterior in the assembled state, wherein the sleeve and the sealing element have complementary shaped profiles for form-fitting engagement in order to fix the sealing element to the sleeve, and wherein at least one outer sealing lip is formed on the outer peripheral surface of the sealing element, which outer sealing lip bears with elastic deformation against an inner peripheral surface of the socket in the assembled state of the plug-in connection; the shaped profile of the sleeve is an axially undercut transverse recess which, starting from the peripheral surface of the sleeve, passes through the sleeve in the direction transverse to the axis of the sleeve, wherein the shaped profile of the sealing element is a fixing body integrally formed thereon, which can be inserted into the transverse recess transversely to the axis of the sleeve.

According to the basic concept of the invention, the sealing element is not combined with the sleeve in the axial direction as in the two sealing arrangements according to the prior art outlined in the introduction, but rather the complementary shaped profiles of sealing element and sleeve enter into form-fitting engagement as a result of being pushed in from the side, transversely to the axis of the sleeve. As a result of this design, the sealing element cannot be pulled out and separated from the sleeve when the plug-in fitting is pulled out of the socket. There is also no damage to the sealing element caused by pulling the plug-in fitting out of the socket. Moreover, when the sealing element is combined with the sleeve, only relatively small elastic deformations of the sealing element are necessary in order to captively fix the sealing element on the sleeve.

Preferably, the transverse recess of the sleeve, which sleeve is hollow-cylindrical at its sealing-element-side end and ends with an annular end face arranged perpendicular to the axis of the sleeve, is formed of an outer and an inner recess section, of which the outer recess section is a longitudinal slot which starts from the annular end face and runs diametrically through the sleeve, the wall surfaces of this longitudinal slot running parallel to one another and to the axis of the sleeve, while the inner recess section is a transverse slot which runs parallel to the annular end face through the sleeve, the transverse dimension of said transverse slot being larger than the distance between the wall surfaces of the longitudinal slot, so that the transverse recess in the sleeve essentially has a T-shaped structure. Here, the fixing body of the sealing element is designed in terms of its shape and dimensions such that it corresponds to the outer and inner recess sections of the transverse recess of the sleeve. In this way it is possible to achieve undercut surfaces of considerable size which are directed transversely to the pull-out direction of the plug-in fitting, which surfaces, on account of the fixing body of complementary design, securely hold the sealing element on the sleeve so as to withstand even high pull-out forces in the axial direction. With this design of sleeve and sealing element, the plug-in fitting can be frequently pulled out of the socket and reconnected to the latter without separation of the sealing element from the sleeve and without any risk of damage to the sealing element and also without any impairment in the sealing action.

The transverse recess in the sleeve and the complementarily shaped fixing body of the sealing element may also be structured in an L-shaped manner for example. However, the essential thing is that sufficiently large undercut surfaces are provided in the transverse recess of the sleeve, against which corresponding surfaces of the fixing body of the sealing element bear.

Continuing the concept of the invention, the inner diameter of the annular end face of the sleeve, which end face is interrupted by the outer recess section at diametrically opposite points, may be larger than the inner diameter of the sleeve which corresponds to the outer diameter of the hydraulic line, wherein two opposite concave cylindrical wall section surfaces are formed concentrically to the axis of the sleeve between in each case two wall surfaces of the outer recess section, the installed sealing element bearing against said concave cylindrical wall section surfaces with corresponding convex cylindrical wall section surfaces of its fixing body, wherein two opposite thin-walled wall sections are formed between the convex cylindrical wall section surfaces of the sealing element and the inner peripheral surface of the sealing element, said thin-walled wall sections being able to be elastically deformed upon insertion of the fixing body of the sealing element into the undercut transverse recess, as a result of which the sealing element is fixed to the sleeve. With this design of the sleeve and of the sealing element, two thin-walled, outwardly convex wall sections are thus formed on the fixing body of the sealing element, which convex wall sections are elastically deformed during installation of the sealing element on the sleeve and bear against correspondingly concave wall section surfaces of the sleeve when the fixing body of the sealing element has been fully introduced transversely into the sleeve, and in this way help to captively fix the sealing element on the sleeve in the transverse direction too.

Finally, during installation of the sealing element on the sleeve, the sealing element is firstly guided on two opposite wall surfaces of the outer recess section of the sleeve with corresponding wall surfaces of its fixing body, before the thin-walled wall sections are subjected to elastic deformation between two parallel wall surfaces of the outer recess section of the sleeve. As a result of the particular design of the outer recess section as a longitudinal slot, guide surfaces are thus formed on the sleeve which, in conjunction with corresponding surfaces on the fixing body of the sealing element, facilitate the transverse insertion of the sealing element and aid automatic assembly.

BRIEF DESCRIPTION OF THE DRAWINGS

Further details regarding the invention will be explained in more detail below with reference to the drawings, which show an example of embodiment. In the drawings.

DETAILED DESCRIPTION OF THE PREFERRED EMBODIMENT

Figure 1:
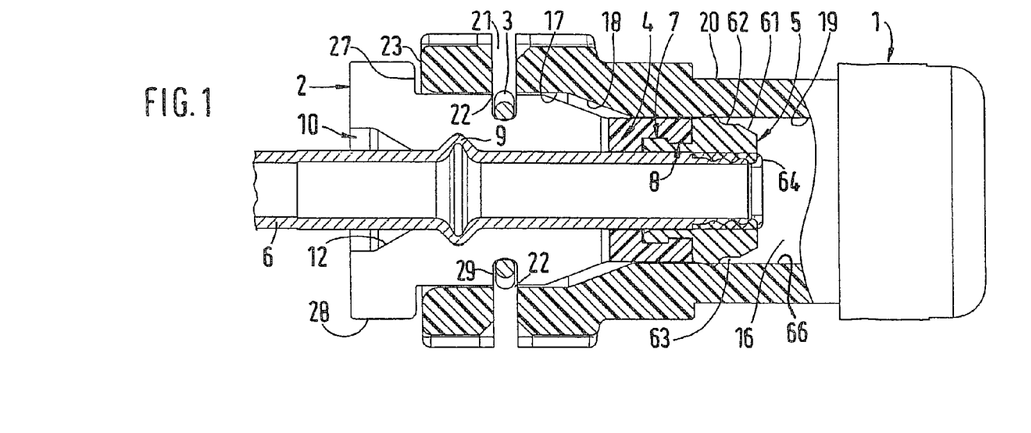
FIG. 1 shows a longitudinal sectional view of an assembled plug-in connection which comprises a socket and a plug-in fitting attached to a hydraulic tube, with a preferred example of embodiment of the inventive sealing arrangement of the sleeve and the sealing element.

The hydraulic plug-in connection shown in FIG. 1 consists of a socket 1 and a plug-in fitting 2 which is connected thereto and which can be releasably fixed in a sleeve 4 by means of a securing element 3 made of spring steel wire. The socket 1 may be the connection piece to a hydraulic unit, for example a cylinder housing, or else a bushing which connects two hydraulic lines.

The plug-in fitting 2 comprises an elastic sealing element 5 for sealing off the plug-in connection with respect to the exterior, and the sleeve 4 which is attached to a hydraulic tube 6 of a hydraulic line. A shaped profile 7, which will be described in more detail below, is formed on the sealing element and serves for form-fitting engagement with a complementary shaped profile 8 on the sleeve 4, which will also be described in more detail below, so as to undetachably fix the sealing element 5 on the sleeve 4.

As can be seen from FIGS. 1, 5, 6 and 9, a flange 9 is formed on the hydraulic tube 6, which flange serves to axially fix the sleeve 4 on the hydraulic tube 6. The hydraulic tube 6 moreover has a constant outer diameter and extends beyond the sleeve 4 through the sealing element 5 and protrudes somewhat beyond the sealing element 5 in the axial direction, as illustrated for example in FIGS. 1 and 6.

The essentially hollow-cylindrical sleeve 4, which will be described with reference to FIGS. 10 to 13, is preferably made of a suitable plastic and can therefore be produced in a cost-effective manner as an injection-molded part with high dimensional precision and a good surface quality, without the need for mechanical post-processing. Metal may be used as the material for the sleeve 4 if it serves to form a plug-in fitting on a hose part.

The sleeve 4 has a through-channel 10 which, starting from the sealing-element-side end of the sleeve 4, includes a first cylindrical section 11, which has a slightly larger diameter than the hydraulic tube 6, followed by a transition section 12 which widens in a conical manner and then a second cylindrical section 13 which has a larger diameter than the first cylindrical section 11.

Close to the conical transition section 12 of the through-channel 10, the first cylindrical section 11 thereof is provided with an annular groove 14 which has an essentially triangular cross section and which serves to receive, in a form-fitting manner, the flange 9 formed on the hydraulic tube 6. The sleeve 4 furthermore has four narrow longitudinal slots 15 which are arranged in a cross shape, which start from the end of the sleeve 4 remote from the sealing element 5 and which allow a limited radial widening of the sleeve 4 when the sleeve 4 is fitted on the flange 9 of the hydraulic tube 6.

The socket 1 shown in FIG. 1 is likewise made of plastic and has a blind hole 16 which, starting from the open end of the socket 1, comprises a peripheral inner surface 66 having three sections, namely a first cylindrical section 17, a conical transition section 18 and a second cylindrical section 19 which has a smaller diameter than the first cylindrical section 17.

In the region of the second cylindrical section 19, the socket 1 has on its outer periphery an annular cutout 20 which serves to fix the socket 1 on the motor vehicle. The socket 1 also has on its outer periphery, in the region of the first cylindrical section 17, a groove 21 for axially fixing the securing element 3 and a plurality of peripheral slots 22 in the base of the groove 21, through which the legs of the securing element 3 extend radially inwards into the blind hole 16 of the socket 1, in order to axially fix the plug-in fitting 2 in the socket 1 in the assembled state of the plug-in connection. The annular end face 23 at the open end of the socket 1 serves as a stop for the plug-in fitting 2.

As can be seen in particular from FIGS. 10 to 13, the outer periphery of the sleeve 4 starts at its sealing-element-side end with a first cylindrical section 24, which is followed by a conical transition section 25, which is in turn followed by a second cylindrical section 26 of larger outer diameter. The second cylindrical section 26 is delimited by an annular shoulder 27 of an annular collar 28 at the end, said annular shoulder being perpendicular to the sleeve axis. The outer diameter of the first cylindrical section 24 is such that it can be received in the second cylindrical section 19 of the blind hole 16 of the socket 1 essentially without play, while the outer diameter of the second cylindrical section 26 of the sleeve 4 is slightly smaller than the inner diameter of the first cylindrical section 17 of the blind hole 16 of the socket 1.

The second cylindrical section 26 on the outer periphery of the sleeve 4 has an annular groove 29 which is essentially square in cross section and which has side faces perpendicular to the sleeve axis, the depth of said annular groove being such that it is larger than the radius of the spring steel wire of the securing element 3 fitted on the outer periphery of the socket 1, so that the legs of the securing element 3 which extend through the groove 21 and the peripheral slots 22 of the socket 1 can come to bear in a linear manner against the side faces of the annular groove 29. The annular shoulder 27 on the annular collar 28 of the sleeve 4 serves as a stop surface for the end face 23 at the open end of the socket 1, unless an axial relative movement between the sleeve 4 and the socket 1 is already limited by the engagement of the securing element 3 in the annular groove 29 on the outer periphery of the sleeve 4.

The shaped profile 8 of the sleeve 4, which serves to fix and guide the sealing element 5, is an axially undercut transverse recess 30 (FIG. 3) which, starting from the peripheral surface of the first cylindrical section 24 of the outer periphery of the sleeve 4, passes through the sleeve 4 in the transverse direction and, in the illustrated example, at right angles to the sleeve axis. The transverse recess 30, the outward appearance of which can be seen in particular from FIGS. 3, 7, 10, 11 and 13, is formed of an outer recess section 31 and an inner recess section 32. The outer recess section 31 is a longitudinal slot which starts from an annular end face 33 at the sealing-element-side end of the sleeve 4 and runs diametrically through the sleeve 4, said sleeve being hollow-cylindrical in the region of the transverse recess 30, wherein the four wall surfaces 34, 35, 36 and 37 of the longitudinal slot, which lie opposite one another in pairs, run parallel to one another and to the axis of the sleeve 4. The annular end face 33 of the sleeve 4 is oriented perpendicular to the sleeve axis. The inner recess section 32 is a transverse slot which runs parallel to the annular end face 33 through the sleeve 4 and which, together with the longitudinal slot of the outer recess section 31, forms a T-shaped transverse recess 30, as can be seen in particular from FIGS. 2 and 3.

Figure 13:
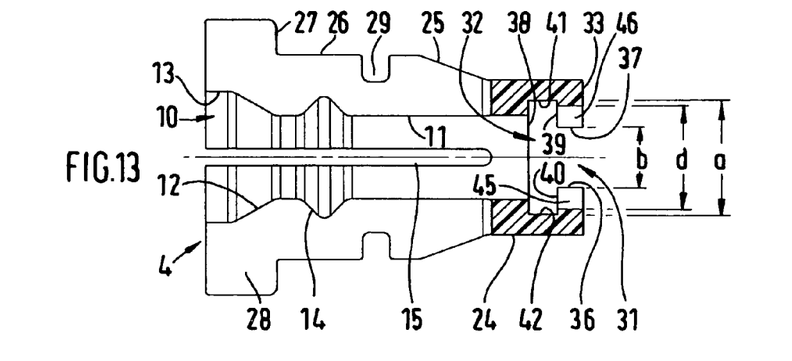
FIG. 13 shows the longitudinal section through the sleeve along the section line XIII-XIII in FIG. 10.

The inner recess section 32 of the sleeve 4, which is in the form of a transverse slot, is delimited by five wall surfaces 38, 39, 40, 41 and 42, of which the wall surfaces 39 and 40 are located in one plane, as can best be seen from FIG. 13. The wall surfaces 39 and 40 form the axial undercut of the transverse recess 30. The transverse dimension a of the inner recess section 32 is larger than the distance b between the pairs of wall surfaces 34, 35 and 36, 37 of the outer recess section 31 which is in the form of a longitudinal slot.

Figure 17:
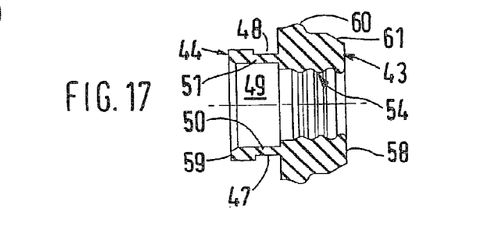
FIG. 17 shows the longitudinal section through the sealing element along the section line XVII-XVII in FIG. 14.
Figure 18:
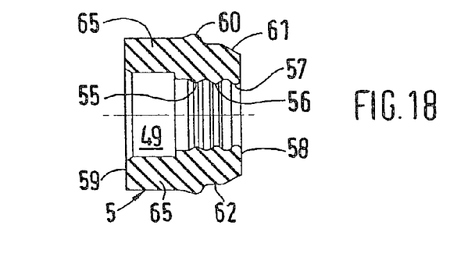
FIG. 18 shows the longitudinal section through the sealing element along the section line XVIII-XVIII in FIG. 16.

The shaped profile 7 of the sealing element 5 is a fixing body 44 (FIG. 17) which is integrally formed on the main body 43 of the sealing element 5, the shape and dimensions of said fixing body being designed to correspond to the outer and the inner recess section 31, 32 of the transverse recess 30 of the sleeve 4, said fixing body being able to be inserted into the transverse recess 30 transversely with respect to the axis of the sleeve 4.

Figure 11:
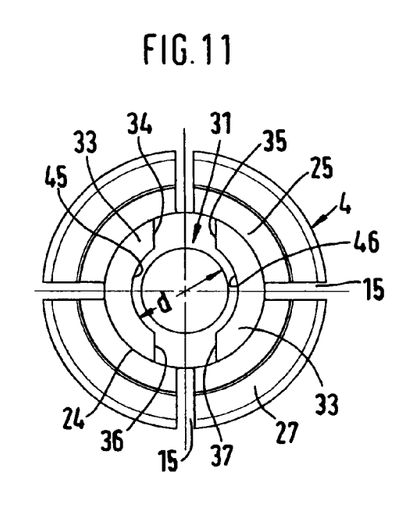
FIG. 11 shows the front view of the sleeve.
Figure 12:
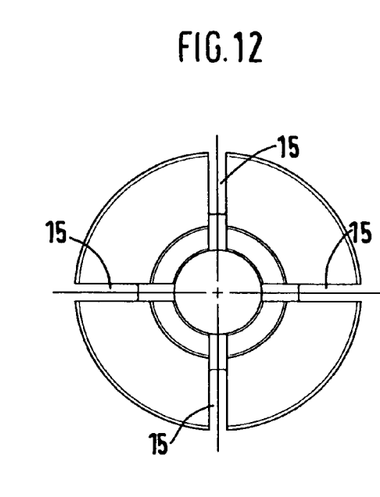
FIG. 12 shows the rear view of the sleeve.

As can be seen in particular from FIGS. 11 and 13, the inner diameter d of the annular end face 33 of the sleeve 4, which end face is interrupted by the outer recess section 31 at diametrically opposite points, is larger than the inner diameter in the first cylindrical section 11 of the sleeve 4, which corresponds to the outer diameter of the hydraulic line 6. As a result, two opposite concave cylindrical wall section surfaces 45 and 46 are formed concentrically to the axis of the sleeve 4 between in each case two wall surfaces 35, 37 and 34, 36 of the outer recess section 31. The sealing element 5 has corresponding convex cylindrical wall section surfaces 47 and 48 on its fixing body 44, which convex cylindrical wall section surfaces bear against the concave cylindrical wall section surfaces 45 and 46 of the sleeve 4 when the sealing element 5 is installed. Two opposite, thin-walled wall sections 50 and 51 are formed between the convex cylindrical wall section surfaces 47 and 48 of the fixing body 44 of the sealing element 5 and the inner peripheral surface 49 of the sealing element 5, which thin-walled wall sections can be elastically deformed when the fixing body 44 of the sealing element 5 is inserted into the undercut transverse recess 30, as a result of which the sealing element 5 is captively fixed on the sleeve 4.

Figure 14:
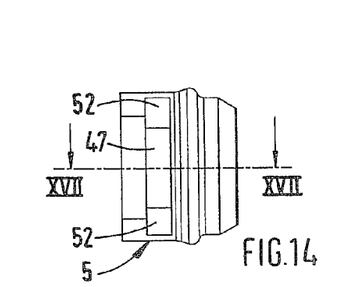
FIG. 14 shows a side view of the sealing element.
Figure 15:
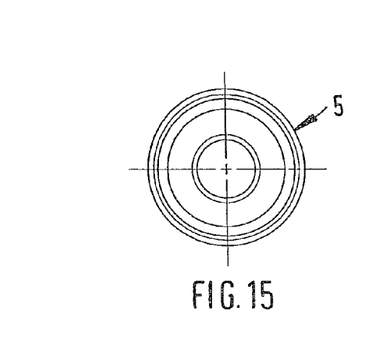
FIG. 15 shows the front view of the sealing element.
Figure 16:
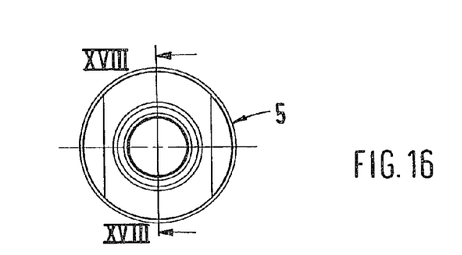
FIG. 16 shows the rear view of the sealing element.

During installation of the sealing element 5 on the sleeve 4, the sealing element 5 is firstly guided on two opposite wall surfaces 34, 35 or 36, 37 (FIG. 11) of the outer recess section 31 in the form of the longitudinal slot with corresponding wall surfaces 52, 53 (FIGS. 4, 14) in the case of transverse insertion, before the thin-walled wall sections 50, 51 (FIG. 17) of the fixing body 44 are subjected to elastic deformation between two parallel opposite wall surfaces 34, 35 or 36, 37 of the outer recess section 31 of the sleeve 4. As a result, the process of combining the sealing element 5 with the sleeve 4 is made easier and can be carried out by machine.

As can be seen in particular from FIGS. 1, 8, 17 and 18, the inner peripheral surface 49 of the sealing element 5, which approximately corresponds to the outer diameter of the hydraulic tube 6, is adjoined by a sealing region 54 of smaller inner diameter which is located in the main body 43 of the sealing element 5 and which has three respectively concentric inner sealing lips 55, 56, 57 (FIG. 18) which are spaced apart from one another in the axial direction and form an essentially sinusoidal sealing profile with three sealing edges and two profile dips arranged therebetween. The sealing region 54 ends at an end face 58 at the end of the sealing element 5 remote from the sleeve 4, which end face 58, like the end face 59 of the sealing element 5 at the sleeve side, is planar and at right angles to the central axis of the sealing element 5.

Located on the outer peripheral surface of the sealing element 5, in the region of the main body 43 thereof, is an outer sealing lip 60 which is concentric thereto and which has a profile corresponding to the inner sealing lips 55, 56, 57, which outer sealing lip bears with elastic deformation in a sealing manner against the second cylindrical section 19 of the blind hole 16 of the socket 1 in the assembled state of the plug-in connection.

Figure 6:
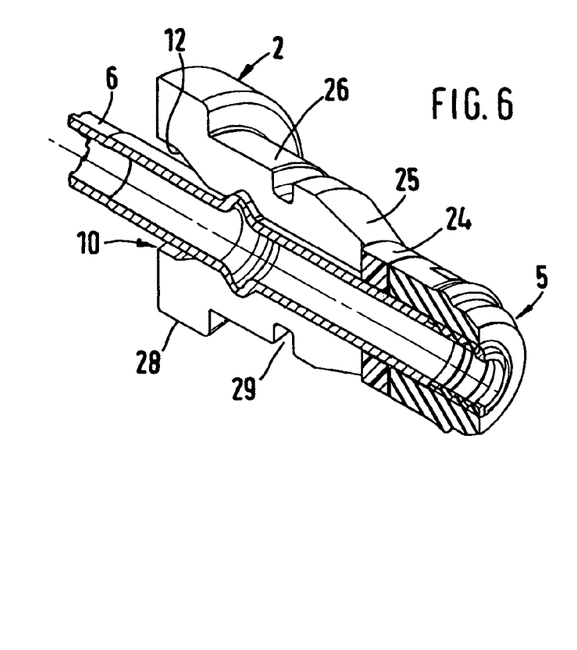
FIG. 6 shows a perspective view, corresponding to FIG. 2 but in longitudinal section, of the plug-in fitting.
Figure 7:
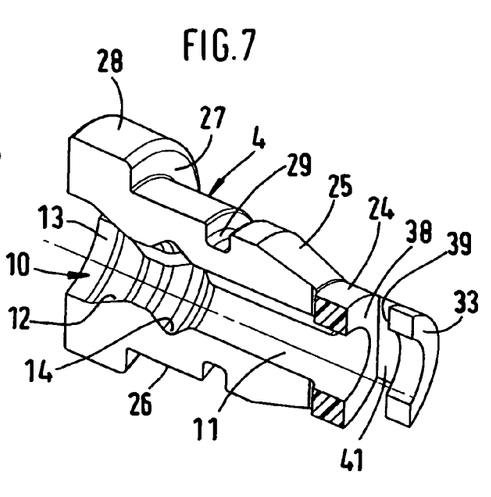
FIG. 7 shows a perspective view, corresponding to FIG. 3 but in longitudinal section, of the sleeve.
Figure 8:
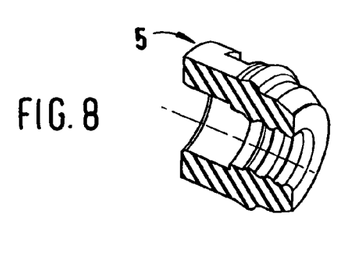
FIG. 8 shows a perspective view, corresponding to FIG. 4 but in longitudinal section, of the sealing element.
Figure 9:
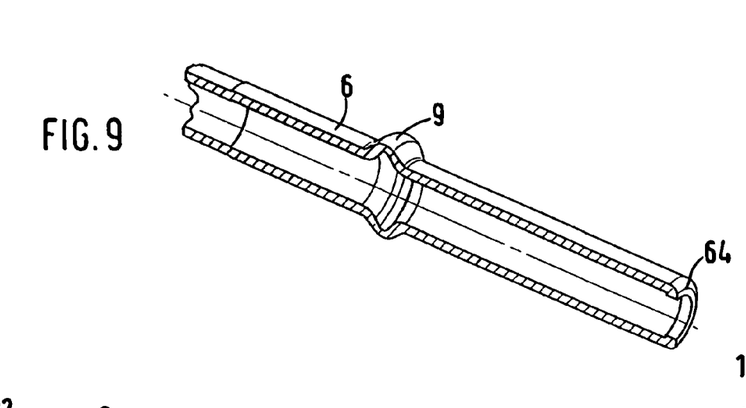
FIG. 9 shows a perspective view, corresponding to FIG. 5 but in longitudinal section, of the hydraulic tube.
Figure 10:
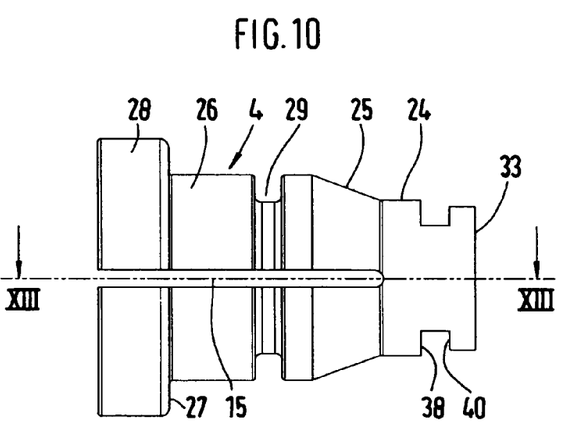
FIG. 10 shows a side view of the sleeve.

In FIGS. 1 and 6, the inner sealing lips 55, 56, 57 and the outer sealing lip 60 are shown in the non-deformed state for the purposes of illustration, but bear flat against the opposite cylindrical surfaces of the hydraulic tube 6 and the socket 1 under elastic deformation.

The end face 58 of the sealing element 5 which is remote from the sleeve is adjoined towards the outside by a conical surface 61 which facilitates the insertion of the plug-in fitting 2 into the second cylindrical section 19 of the blind hole 16 of the socket 1. The conical surface 61 is adjoined by a cylindrical section 62 of the sealing element 5, the diameter of which is smaller than the diameter of the second cylindrical section 19 of the blind hole 16. As a result, a gap 63 is formed in the installed state of the plug-in fitting 2, said gap being shown in FIG. 1. The pressurized hydraulic medium can penetrate into the gap 63 in order to press the sealing element 5 against the hydraulic tube 6.

Figures 2, 3, 4, 5:
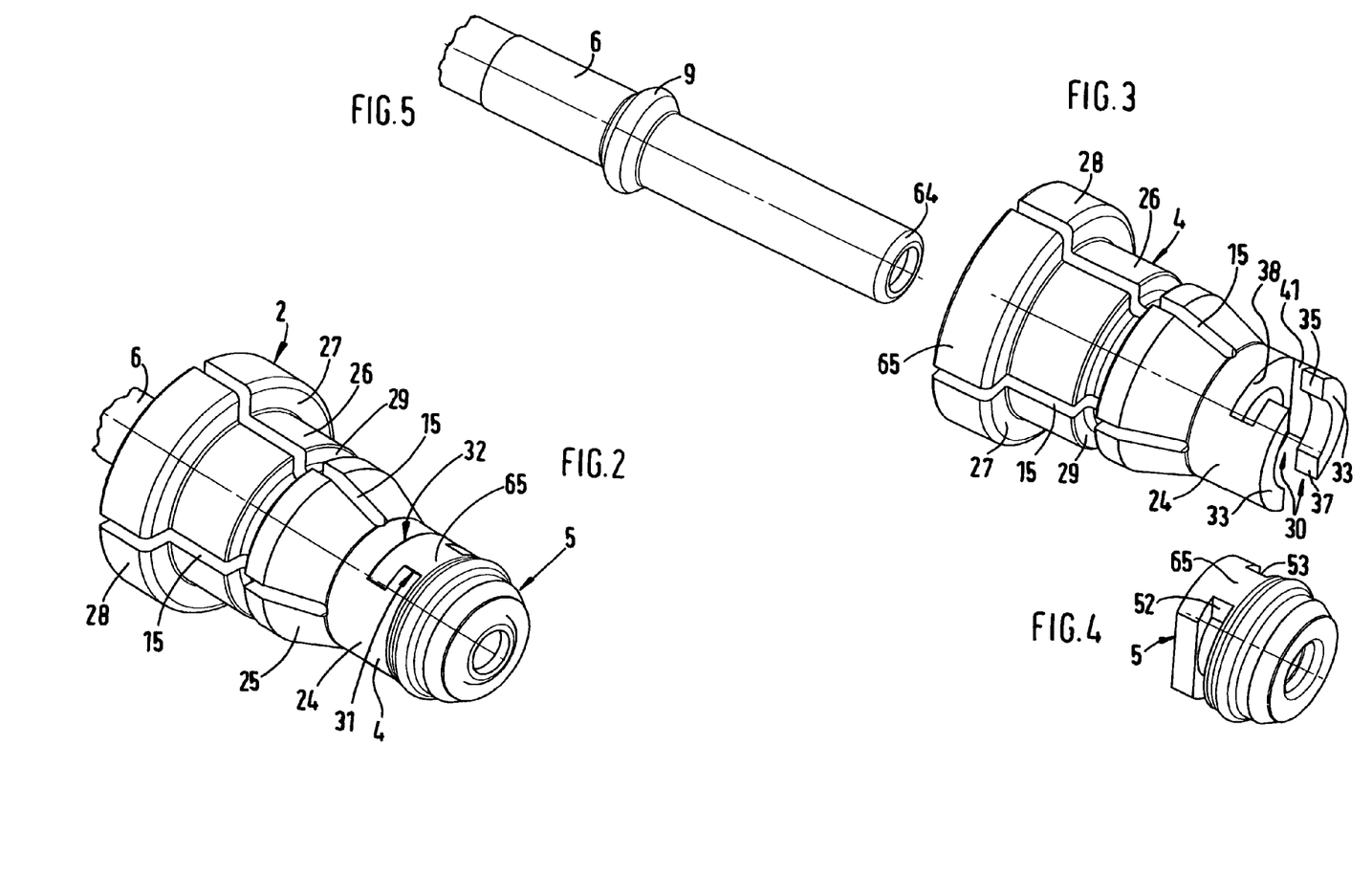
FIG. 2 shows a perspective view of the assembled plug-in fitting shown in FIG. 1.
FIG. 3 shows a perspective view of the sleeve.
FIG. 4 shows a perspective view of the elastic sealing element.
FIG. 5 shows a perspective view of the hydraulic tube (shown broken off), to which the plug-in fitting is to be attached.

Due to the considerable distances between the wall surfaces 52, 53 on the fixing body 44 of the sealing element 5, which correspond to the distances between the pairs of wall surfaces 34, 35 and 36, 37 of the sleeve 4, the main body 43 of the sealing element 5 is connected to the large-surface-area sections of the fixing body 44 located in the undercut in the inner recess section 32 of the transverse recess 30 of the sleeve 4 not only via the elastically deformable thin-walled wall sections 50, 51 but rather predominantly via two webs 65 of large cross section (FIGS. 2, 4). Therefore, even if the plug-in fitting 2 is frequently pulled out of the socket 1, the main body 43 of the sealing element 5 cannot become separated from the fixing body 44 of the sealing element 5 which is anchored in the inner recess section 32. The sleeve 4 and the sealing element 5 fixed thereon in the manner according to the invention form a plug-in fitting 2 from which the sealing element 5 also cannot be inadvertently detached.

The plug-in fitting 2, consisting of the sleeve 4 and the sealing element 5 fixedly connected thereto, is a pre-assembled semi-finished product which, after automatic assembly, can be stored without any problem, i.e. the sleeve 4 and the sealing element 5 retain their defined relative installed position when stacked in the storage or transport container.

The manufacture and assembly of the previously described plug-in connection will be described below, wherein the assembly process can also be carried out entirely by machine.

Firstly, the flange 9 is formed on the cut-to-length hydraulic tube 6 by axial upsetting at a predefined distance from the end of the tube. In the same manufacturing step or a subsequent step, a rounded portion 64 is formed at the end of the tube.

Before or after this preparation of the hydraulic tube 6, the sealing element 5, which has been produced to specific dimensions in a vulcanizing mould, is inserted from the side, at right angles to the sleeve axis, into the transverse recess 30 of the sleeve 4, which has been produced to specific dimensions by means of an injection molding process. In the process, a temporary partial elastic deformation of the sealing element 5 takes place, as already described above.

The sleeve 4 with the pre-installed sealing element 5 is then attached to the hydraulic tube 6. To this end, the sleeve 4 with its annular collar 28 is pushed over the end of the hydraulic tube 6 until the flange 9 comes to bear against the conical transition section 12 of the through-channel 10. Here, the end of the hydraulic tube 6 with the rounded portion 64 has already penetrated into the sealing element 5. As the sleeve 4 continues to be pushed onto the hydraulic tube 6, the flange 9 bearing against the conical transition section 12 pushes the sleeve 4 apart, said sleeve being radially expandable on account of the longitudinal slots 15, until the flange 9 latches into the annular groove 14 in the through-channel 10 of the sleeve 4. The sleeve 4 is thus securely fixed on the hydraulic tube in the axial direction. Moreover, during the pushing-on operation, the rounded portion 64 at the end of the hydraulic tube 6 has pushed through the sealing element 5, so that the components of the plug-in connection assume the position shown in FIG. 1. The plug-in fitting 2 can now be inserted into the blind hole 16 of the socket 1 and secured axially by the securing element 3. The plug-in connection is thus ready for use.

The sealing arrangement is fitted on a hydraulic plug-in connection which is provided in particular for use in the hydraulic system of motor vehicles. The plug-in connection consists of a socket and of a plug-in fitting which can be connected thereto, said plug-in fitting being attached to a hydraulic tube. The plug-in fitting comprises a sleeve and a sealing element fixed thereto, which in the assembled state of the plug-in connection seals off the plug-in connection both from the hydraulic tube and from the exterior of the socket by means of integral sealing lips. The sealing element and the end of the sleeve which receives the sealing element are designed in a particular manner so as to be able to install the sealing arrangement in a simple manner, and in particular by way of a machine, without it being possible for the sealing element to be separated axially from the sleeve when the plug-in connection is released. To this end, it is provided that the sealing element is pushed into an undercut transverse recess of the sleeve from the side, and is held there in a form fit so as to withstand even high axial separation forces.

Other variations and modifications are possible without departing from the scope and spirit of the present invention as defined by the appended claims.

We claim:

1. A sealing arrangement for a hydraulic plug-in connection which comprises a socket, having an inner peripheral surface, and a plug-in fitting which can be connected thereto, said plug-in fitting being attached to a hydraulic line and comprising a sleeve, the sleeve defining an axis and having an outer peripheral surface, and an elastic sealing element which seals off the plug-in connection from the exterior in the assembled state, wherein the sleeve and the sealing element have complementary shaped profiles for form-fitting engagement in order to fix the sealing element to the sleeve, and wherein the sealing element has an outer peripheral surface and at least one outer sealing lip is formed on the outer peripheral surface of the sealing element, which outer sealing lip bears with elastic deformation against the inner peripheral surface of the socket in the assembled state of the plug-in connection; wherein the shaped profile of the sleeve is an axially undercut transverse recess which, starting from the outer peripheral surface of the sleeve, passes through the sleeve in a direction transverse to the axis of the sleeve and defines an insertion opening on the outer peripheral surface of the sleeve, and wherein the shaped profile of the sealing element is a fixing body integrally formed thereon, which is insertable through the insertion opening into the axially undercut transverse recess transversely to the axis of the sleeve.

2. A sealing arrangement according for a hydraulic plug-in connection which comprises a socket, having an inner peripheral surface, and a plug-in fitting which can be connected thereto, said plug-in fitting being attached to a hydraulic line and comprising a sleeve, the sleeve defining an axis and having an outer peripheral surface, and an elastic sealing element which seals off the plug-in connection from the exterior in the assembled state, wherein the sleeve and the sealing element have complementary shaped profiles for form-fitting engagement in order to fix the sealing element to the sleeve, and wherein the sealing element has an outer peripheral surface and at least one outer sealing lip is formed on the outer peripheral surface of the sealing element, which outer sealing lip bears with elastic deformation against the inner peripheral surface of the socket in the assembled state of the plug-in connection; wherein the shaped profile of the sleeve is an axially undercut transverse recess which, starting from the outer peripheral surface of the sleeve, passes through the sleeve in a direction transverse to the axis of the sleeve, and wherein the shaped profile of the sealing element is a fixing body integrally formed thereon, which is insertable into the axially undercut transverse recess transversely to the axis of the sleeve; wherein the transverse recess of the sleeve, which sleeve has a sealing-element-side end and is hollow-cylindrical at its sealing-element-side end and ends with an annular end face arranged perpendicular to the axis of the sleeve, is formed of an outer and an inner recess section, of which the outer recess section is a longitudinal slot which starts from the annular end face and runs diametrically through the sleeve, this longitudinal slot having wall surfaces which run parallel to one another and to the axis of the sleeve, while the inner recess section is a transverse slot which runs parallel to the annular end face through the sleeve, the transverse slot having a transverse dimension which is larger than the distance between the wall surfaces of the longitudinal slot.

3. A sealing arrangement according to claim 2, wherein the fixing body of the sealing element is designed in terms of its shape and dimensions such that it corresponds to the outer and inner recess sections of the transverse recess of the sleeve.

4. A sealing arrangement according to claim 3, wherein the inner diameter of the annular end face of the sleeve, which end face is interrupted by the outer recess section at diametrically opposite points, is larger than the inner diameter of the sleeve which corresponds to the outer diameter of the hydraulic line, wherein two opposite concave cylindrical wall section surfaces are formed concentrically to the axis of the sleeve between in each case two wall surfaces of the outer recess section, the installed sealing element bearing against said concave cylindrical wall section surfaces with corresponding convex cylindrical wall section surfaces of its fixing body, wherein two opposite thin-walled wall sections are formed between the convex cylindrical wall section surfaces of the sealing element and the inner peripheral surface of the sealing element, said thin-walled wall sections being able to be elastically deformed upon insertion of the fixing body of the sealing element into the undercut transverse recess, as a result of which the sealing element is fixed to the sleeve.

5. A sealing arrangement according to claim 4, wherein, during installation of the sealing element on the sleeve, the sealing element is firstly guided on two opposite wall surfaces of the outer recess section of the sleeve with corresponding wall surfaces of its fixing body, before the thin-walled wall sections are subjected to elastic deformation between two parallel wall surfaces of the outer recess section of the sleeve.

* * * * *

UNITED STATES PATENT AND TRADEMARK OFFICE
CERTIFICATE OF CORRECTION

PATENT NO. : 7,604,262 B2 Page 1 of 1
APPLICATION NO. : 11/728769
DATED : October 20, 2009
INVENTOR(S) : Stephen Elflein and Albert Vogel It is certified that error appears in the above-identified patent and that said Letters Patent is hereby corrected as shown below:

Claim 2, col. 9, line 4 - After "arrangement", delete "according"

Signed and Sealed this

Eighteenth Day of May, 2010

David J. Kappos
*Director of the United States Patent and Trademark Office*